United States Patent [19]

Albrecht et al.

[11] 4,400,638
[45] Aug. 23, 1983

[54] SHAFT MOUNTED EDDY CURRENT DRIVE

[75] Inventors: James W. Albrecht, Centerville, Ohio; Harold G. Spriggs, Farmers Branch, Tex.

[73] Assignee: Stromag, Inc., Dayton, Ohio

[21] Appl. No.: 294,586

[22] Filed: Aug. 20, 1981

[51] Int. Cl.³ .............................................. H02K 49/00
[52] U.S. Cl. ...................................... 310/95; 310/105; 310/168; 310/239
[58] Field of Search .................... 310/105, 95, 94, 168, 310/239, 219, 232, 68 R

[56] References Cited

U.S. PATENT DOCUMENTS

| 2,616,069 | 10/1952 | Jaeschke | 310/105 X |
| 3,294,995 | 12/1966 | Edick | 310/95 |
| 3,303,367 | 2/1967 | Jaeschke et al. | 310/105 X |
| 3,584,248 | 6/1971 | Higashino et al. | 310/239 X |
| 3,716,788 | 2/1973 | Nishida | 310/168 X |

Primary Examiner—Donovan F. Duggan
Attorney, Agent, or Firm—Biebel, French & Nauman

[57] ABSTRACT

A shaft mounted eddy current variable speed drive or clutch has a hub which is adapted to be mounted on the shaft of a prime mover, such as an electric motor, and drives an armature. The hub includes an annular armature. A driven magnetic body is mounted for rotation on the hub and includes an array of poles magnetically associated with the armature through a working air grap and are energized from an electric coil mounted on the magnetic body. A slip ring assembly is also mounted on the magnetic body as well as an output pulley through which power is taken from the body. A non-rotating brush holder assembly, as well as a magnetic speed pick-up are mounted on a support bracket which bracket is, in turn, piloted to and mounted on the hub through a bearing. A torque arm prevents the rotation of the brush assembly and magnetic pick-up. The piloting of the non-rotating electrical components directly to the hub maintains a fixed and desired radial spacing of these components with their associated rotating components on the magnetic body.

7 Claims, 2 Drawing Figures

SHAFT MOUNTED EDDY CURRENT DRIVE

BACKGROUND OF THE INVENTION

This invention relates to shaft mounted eddy current drives or clutches and more particularly to the general type of drive in which a magnetic body is rotatably mounted on a driven shaft mounted hub. The body contains or supports an electric coil fed through slip rings from a relatively stationary brush holder assembly. A magnetic speed pick-up may also be employed by means of which the rotational speed of the output may be monitored.

In drives of the general kind described, it has been customary to provide a stationary mounting bracket or mounting member adjacent the drive for supporting the slip ring brush holder assembly and, when used, for supporting the speed sensing device, such as a magnetic pick-up. Since the clutches or variable speed drives of the kind to which the invention is applied are frequently mounted directly on a drive shaft of a prime mover, such as the shaft of an electric motor, it has been difficult in practice to maintain uniform spacing between the non-rotating portions, including the brush holder assembly and the magnetic pick-up on the one hand, and the slip rings and a toothed speed indicator gear on the other hand. Radial and/or axial misalignments between the driven member and the fixed electrical support brackets result in misalignments of the brush holder and/or the magnetic pick-up with respect to their cooperating rotating members, and result in operational difficulties. This is particularly true where the driven member includes or incorporates a drive pulley by means of which the power is taken from the driven member through V-belts or the like. Under the stress of load and load changes, the precise alignment and spacing between a fixed or non-rotating brush holder or magnetic pick-up or the like and the cooperating rotating elements is difficult to maintain.

SUMMARY OF THE INVENTION

The present invention is directed to shaft mounted variable speed drives which employ a rotating electrical energizing coil, and more particularly to shaft mounted eddy current drives, such as a variable speed drive, in which a central hub is directly mounted on the output shaft of a prime mover, such as an electric motor, and in which a rotating driven member such as a magnetic body magnetically and physically associated with the coil is piloted by bearings on the hub and which, in turn, supports a power output driver, such as a V-belt pulley.

The particular advantages of the present invention are obtained by supporing the non-rotating electrical components on a support bracket which is piloted or supported on the hub through a bearing. The bracket thus supports the the brush holder assembly and, where applicable, a speed pick-up probe. This may be a magnetic pick-up which cooperates with a toothed gear on the driven member. In this manner, the non-rotating electrical components are physically referenced to the rotating hub and not to a third or unrelated structure, thereby assuring the maintenance of the critical radial clearance distances between the brush holder and the slip rings, and between a non-contacting pick-up, such as a magnetic pick-up, and a suitable motion or speed sending unit, such as a toothed wheel. Thus, the radial clearances which are selected in the design, manufacture, and assembly of the components, are maintained when the equipment is used under a variety of actual working conditions, without reference to other or unrelated structural components.

It is accordingly an important object of this invention to provide a clutch or variable speed drive in which the fixed or non-rotating electrical components are piloted and mounted directly, through a bearing, on one of the rotating components of the clutch or drive.

A further object of the invention is the provision of an eddy current type of variable speed drive in which a brush holder and a magnetic pick-up are supported by an annular support bracked mounted directly to an outer race of a bearing, which bearing is, in turn, mounted on the drive hub for the maintenance of a true radial relationship between the brush holder and the slip rings and between the magnetic pick-up and a toothed wheel.

These and other objects and advantages of the invention will be apparent from the following description, the accompanying drawings, and the appended claims.

DESCRIPTION OF PREFERRED EMBODIMENT

Figure 1:
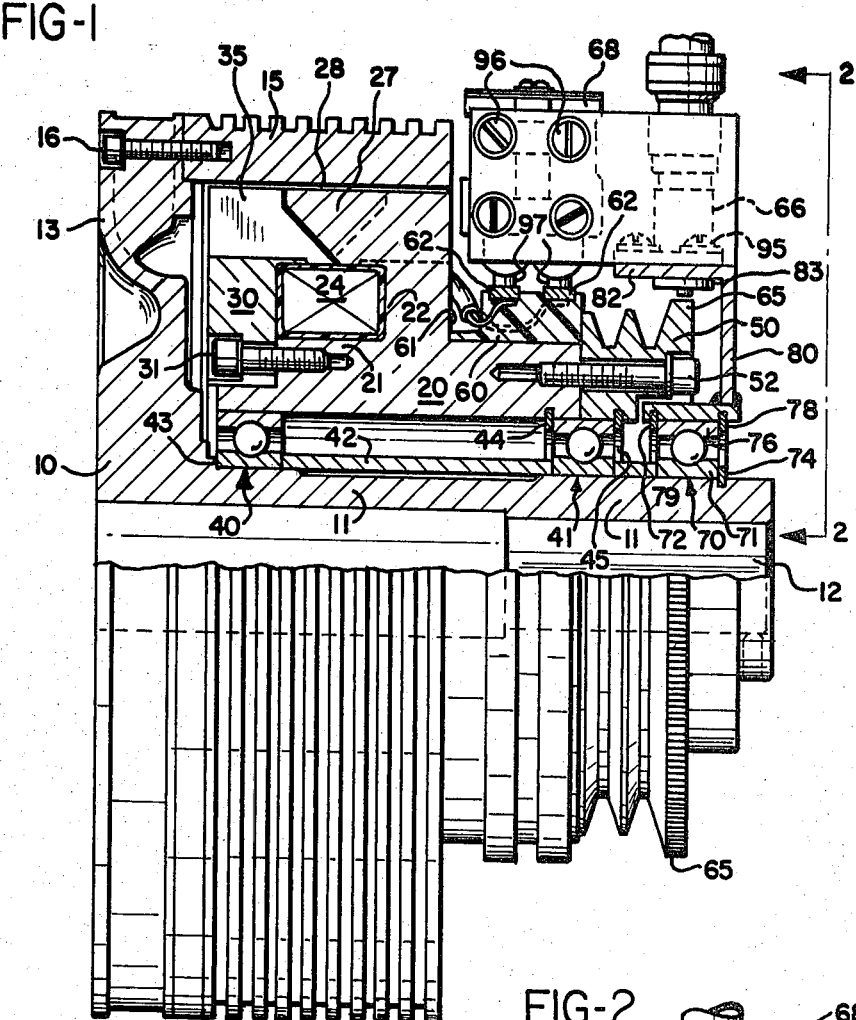
FIG. 1 is an elevational view, partially in longitudinal section, through an eddy current drive in accordance with this invention.

Referring to the figures of the drawing which illustrate a preferred embodiment of the invention, a shaft mounted eddy current drive is shown which includes a central drive shaft or drive hub 10. The hub 10 has an axially extending main suport or body portion 11 which is formed with an internal keyed opening 12 at its inner end adapted to be mounted and supported directly onto the drive shaft of a prime mover, such as the shaft of an electric motor. The hub 10 further includes a generally radially directed end 13 which supports an annular, axially inwardly extending electric armature 15 for rotation therewith. The armature 15 is attached to the end 13 by cap screws 16. The end 13 may also be apertured to form cooling openings or may form vanes for inducing an air flow for cooling the drive.

The eddy current drive further includes a magnetic driven body illustrated generally at 20 formed of ferrous material and rotatably mounted on the hub 10. The magnetic body 20 has an annular, axially extending ledge 21 and a radial wall 22 which receives thereon an encased annular electric energizing coil 24. The body 20 also forms an annular outer series or plurality of individual arcuately spaced poles 27, one of which is shown in section in FIG. 1. The poles 27 have outer surfaces closely spaced to the inside surface of the armature 15 through a working air gap 28. The coil 24 is retained in place by an annular coil retainer 30, also formed of ferrous or suitable magnetic material, which is retained on the body 20 by an annular series of cap screws 31. The retainer is also formed with an annular series of arcuately spaced poles 35, partially axially interdigitated with the poles 27 of the body 20, with outer surfaces in close running relationship with the armature 15.

The application of current to the coil 24 forms a magnetic field between the poles 27 and 35, including the armature 15 and applies a driving force from the armature to the body 20. The extent of the coupling between the armature and the rotating body is approximately dependent upon the magnitude of the current and the coil 24.

The body 20 is piloted or mounted for rotation directly on the axially extending body portion 11 of the hub 10, on a pair of spaced bearings 40 and 41, separated by a spacer tube 42. The outermost bearing 40 is located on a shoulder 43 of the hub 10. The innermost bearing 41 is located on the body 20 by an internal snap ring 44, and is also located on an output pulley 50 by a second internal snap ring 45. The output pulley 50 is bolted to the body 20 by an annular series of socket head screws 52 and thus rotates with the body 20 and provides the output means by which the power is transmitted from the eddy current drive to a remote location or to the equipment which is controlled by the drive.

An annular molded slip ring assembly 60 is captured between a wall of the pulley 50 and an inner radial wall 61 of the body 20, and supports a pair of slip rings 62. The slip rings 62 are connected to the leads from the coil 24 to apply current to the coil in the conventional manner. The pulley 50 is further provided with a suitable speed transmitting means or integral digitated speed indicating means in the form of a toothed periphery 65 on the outer surface thereof which cooperates with the probe or tip of pick-up means in the form of a stationary magnetic pick-up or sensor 66. While the invention is described in relation to a magnetic speed pick-up, it should be understood that other forms of non-contacting speed indicating devices may be used, such as a photo-optical pick-up or a Hall effect pick-up.

Means for piloting and supporting the magnetic pick-up 66 and a brush holder assembly 68 on the hub 10 includes a bearing 70, shown as a ball-type bearing having its inner race 71 mounted directly on an outer surface of the hub and spaced from the bearing 41 by a short tubular spacer 72. The bearing 70 is retained on the hub by an external snap ring 74. While a ball-type bearing is disclosed, it should be understood that the invention is not intended to be limited thereto, and any suitable low friction bearing may be employed.

Non-rotating support means on the bearing 70 includes an annular support sleeve or bracket 75 mounted on the outer race 76 of the bearing 70. The sleeve 75 has an inner surface which forms a close running fit with the outer surface of the outer bearing race 76 and accordingly is supported on the bearing race and through the bearing on the hub 10. The sleeve 75 is retained in place by a pair of internal snap rings 78 and 79 received on either side of the race 76.

Figure 2:
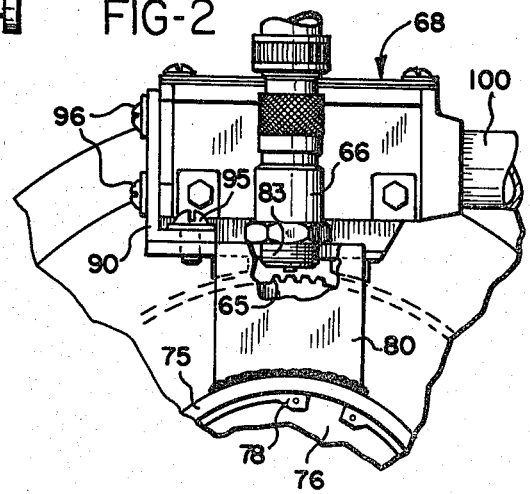
FIG. 2 is a fragmentary rear elevational view looking generally along the lines 2—2 of FIG. 1.

The support means for the brush holder assembly 68 and the magnetic pick-up 66 further includes a generally radially extending arm or support 80 which has its inner end curved to conform with a portion of the outer surface of the sleeve or bracket 75 and is welded thereto, as best shown in FIG. 2. The support 80 is formed with an axially outwardly turned end 82 in partially overlying relation to the pulley 50. The bracket end 82 is provided with an aperture for receiving the probe end 83 of the magnetic pick-up 66, with the probe end extending through the aperture in close proximity to the toothed peripheral portion 65 of the pulley 50, as shown in FIG. 2. The end 82 further supports an upstanding angle bracket 90 retained thereon by screws 95. The angle bracket 90 supports the brush holder asembly 68 by retaining screws 96. The assembly 68 has a pair of brushes 97 which are in running engagement with the underlying slip rings 62.

The annular bracket 75 with the radial support portion 80 extending therefrom, supporting the magnetic pick-up 66 and the brush holder assembly constitute non-rotating support means which is piloted on the hub 10 to define and maintain a fixed spacial relationship between the brushes and the magnetic pick-up, on the one hand, and their cooperative rotating components associated with the body 20, on the other hand.

Torque means for preventing rotation of the annular bracket 75 and the structure associated therewith, may comprises a metal conduit 100 (FIG. 2) attached to the brush holder assembly 68 and through which the power leads may be dressed the power leads to the brushes. It is understood that the other end of conduit 100 will be connected to a suitable control box or the like and will provide the necessary torque arm to retain the bracket 75 and the components mounted thereon in non-rotating relation, and will thus carry the rather low torque which is applied to the support 80 by reason of friction in the piloting bearing 70 and friction or drag at the brushes 97.

The operation of the invention is largely self-evident from the foregoing description. The eddy current clutch portion of the invention operates in a conventional manner by the application of electric current to the coil 24 to provide a variable magnetic coupling between the rotating armature 15, and the teeth or poles 35 and 27 associated with the rotating body 20. The output speed or rate of rotation of the pulley 50, secured to the body 20, is of course, proportional to the pulse rate as detected by the magnetic pulse pick-up 66 and may be used in any conventional speed control circuit. The piloting and maintenance of the radial positions of both the brush holder assembly as well as the magnetic pick-up are structurally and physically related to the surface of the drive hub 10 and are not dependent upon the positioning of any other non-rotating component. In addition to improved reliability, the apparatus offers a cost advantage over drives which employ external or separate supports in that it is substantially self-contained, and may be installed at lower cost.

While the form of apparatus herein described constitutes a preferred embodiment of this invention, it is to be understood that the invention is not limited to this precise form of apparatus, and that changes may be made therein without departing from the scope of the invention.

What is claimed is:

1. An electrical variable speed drive including a hub member adapted for mounting to the drive shaft of a prime mover, a driven body member rotatably supported on said hub member and having a mechanical power output drive portion such as a pulley, an electric coil associated with one of said members, magnetic pole means on said last named member positioned in closely spaced relation to a magnetic armature portion of the other member whereby the extent of coupling between the members is affected by the application of electric current to said coil, and slip ring means for applying current to said coil, the improvement comprising:

bearing means mounted on said hub member,
a brush holder support mounted on said bearing means,
torque means supporting said brush holder support in non-rotating relationship, and
a brush holder mounted on said brush holder support having brushes in engagement with said slip ring means so that displacements in the position of said hub member when rotated by the drive shaft uniformly affect the slip ring means and the brush holder.

2. The drive of claim 1 further comprising digitated speed measuring means rotatably supported by said driven body member, and a speed pick-up mounted on said brush holder support having a probe in spaced relation to said digitated speed means.

3. The drive of claim 2 in which said speed digitated speed means comprises a toothed wheel portion integrally associated with said power output drive portion, and said speed pick-up comprises a magnetic sensor having a probe in spaced relation to the teeth of said tooth wheel portion.

4. In an electromagnetic variable speed drive member in which a hub is mounted on a drive shaft for rotation with the shaft and in which a magnetically coupled driven member is rotatably piloted on the hub, and in which the driven member includes an electric coil by means of which the magnetically coupling is varied between the drive member and the driven member by application of electric current thereto through slip-rings carried on said driven member, and in which the driven member includes a toothed wheel for speed sensing means, the improvement comprising:
- an annular bearing having inner and outer bearing raceways,
- means mounting the inner raceway on said hub,
- an annular bracket mounted on the outer surface of said outer raceway, said annular bracket having a radially extending portion leading therefrom and an axially turned end,
- a brush holder,
- means mounting said brush holder on said bracket end with the brushes thereof in engagement with said slip rings,
- a magnetic pick-up,
- means mounting said magentic pick-up on said bracket end with its probe thereof adjacent said toothed wheel, whereby the radial spacing between said magnetic pick-up and said brush holder on the one hand and said driven member on the other hand remains relatively constant.

5. An electric eddy current variable speed drive including a hub adapted for mounting to the drive shaft of a prime mover, means in said hub defining an armature, a driven body member rotatably supported on said hub and having a mechanical power output drive portion such as a pulley, an electric coil on said driven body member, magnetic pole means on said driven body member positioned in closely spaced relation to said armature whereby the extent of coupling between the armature and the driven body member is affected by the application of electric current to said coil, means for applying current to said coil, and speed transmitting means on said driven body member, the improvement comprising:
- bearing means mounted on said hub,
- a support mounted on said bearing means and extending radially thereof,
- torque means on said support retaining said support in non-rotating relationship, and
- a pick-up probe mounted on said support adjacent said speed transmitting means so that displacements in the position of said hub when rotated by the drive shaft uniformly affect the speed transmitting means and the pick-up probe.

6. The unit of claim 5 in which said transmitting means comprises a toothed wheel portion integrally associated with said power output drive portion, and said speed pick-up probe comprises a magnetic sensor.

7. In an electromagnetic variable speed drive member in which a hub is mounted on a drive shaft for rotation with the shaft and in which a magnetically coupled driven member is rotatably piloted on the hub, and in which the driven member includes an electric coil by means of which the magnetic coupling is varied between the drive member and the driven member by application of electric current thereto through slip-rings carried on said driven member, and in which the driven member includes a toothed wheel for speed sensing means, the improvement comprising:
- a ball bearing having inner and outer bearing raceways,
- means mounting the inner raceway on said hub,
- a bracket having a radially inner end mounted on the outer surface of said outer raceway and having a radially outer end,
- a brush holder,
- means mounting said brush holder on said bracket outer end with the brushes thereof in engagement with said slip rings,
- a magnetic pick-up,
- means mounting said magnetic pick-up on said bracket outer end with its probe thereof adjacent said toothed wheel, whereby the radial spacing between said magnetic pick-up and said brush holder on the one hand and said driven member on the other hand remains relatively constant.

* * * * *

REEXAMINATION CERTIFICATE (2433rd)

United States Patent [19]
Albrecht et al.

[11] B1 4,400,638
[45] Certificate Issued Nov. 29, 1994

[54] SHAFT MOUNTED EDDY CURRENT DRIVE

[75] Inventors: James W. Albrecht, Centerville, Ohio; Harold G. Spriggs, Farmers Branch, Tex.

[73] Assignee: Stromag, Inc., Dayton, Ohio

Reexamination Requests:
No. 90/003,311, Jan. 12, 1994
No. 90/003,317, Jan. 27, 1994

Reexamination Certificate for:
Patent No.: 4,400,638
Issued: Aug. 23, 1983
Appl. No.: 294,586
Filed: Aug. 20, 1981

[51] Int. Cl.⁵ .................................... H02K 49/00
[52] U.S. Cl. .................................... 310/95; 310/105; 310/168; 310/239
[58] Field of Search ............... 310/68 B, 68 R, 71, 310/78, 105, 109, 94, 95, 168, 232, 239

[56] References Cited

U.S. PATENT DOCUMENTS

| Patent No. | Date | Inventor | Class |
|---|---|---|---|
| 1,164,262 | 12/1915 | Creveling | 310/230 |
| 1,638,890 | 4/1924 | Staege | 477/12 |
| 2,365,691 | 12/1944 | Fodor | 242/75 |
| 2,447,130 | 8/1948 | Matulaitis et al. | 310/95 |
| 2,449,779 | 9/1948 | Jaeschke | 310/95 |
| 2,489,184 | 11/1949 | Jaeschke et al. | 310/105 |
| 2,521,574 | 9/1950 | Findley | 310/105 |
| 2,594,931 | 4/1952 | Jaeschke | 310/105 |
| 2,606,948 | 8/1952 | Jaeschke | 172/284 |
| 2,616,069 | 10/1952 | Jaeschke | 318/492 |
| 2,630,466 | 3/1953 | Landis | 310/93 |
| 2,630,467 | 3/1953 | Winther | 172/284 |
| 2,657,323 | 10/1953 | Jaeschke | 310/95 |
| 2,659,020 | 11/1953 | Brown | 310/95 |
| 2,676,280 | 4/1954 | Jaeschke | 310/95 |
| 2,679,604 | 5/1954 | Jaeschke | 310/101 |
| 2,741,437 | 4/1956 | Haworth | 242/413.5 |
| 2,872,606 | 2/1959 | Brill | 310/239 |
| 2,920,221 | 1/1960 | Schwab | 310/96 |
| 2,939,974 | 6/1960 | Knight | 310/95 |
| 2,945,104 | 7/1960 | Jaeschke | 192/84 R |
| 2,957,562 | 10/1960 | Rudisch | 192/84 R |
| 2,973,850 | 3/1961 | Jaeschke | 192/84 A |
| 3,007,066 | 10/1961 | Ponsy | 310/96 |
| 3,028,737 | 4/1962 | Rudisch | 464/29 |
| 3,178,598 | 4/1965 | Cohen et al. | 310/98 |
| 3,214,618 | 10/1965 | Jaeschke | 310/90 |
| 3,229,132 | 1/1966 | Cohen et al. | 310/105 |
| 3,229,796 | 1/1966 | Worst | 192/104 R |
| 3,233,131 | 2/1966 | Stegman | 310/105 |
| 3,294,995 | 12/1966 | Edick | 310/95 |
| 3,303,367 | 2/1967 | Jaeschke et al. | 310/95 |
| 3,394,278 | 7/1968 | Schetinin | 310/105 |
| 3,421,784 | 1/1969 | Paterson | 192/84 R |
| 3,423,616 | 1/1969 | Jacobs | 310/105 |
| 3,423,915 | 1/1969 | Patton | 310/105 |
| 3,463,285 | 8/1969 | Sisler | 192/104 R |
| 3,478,239 | 11/1969 | Jaeschke | 310/105 |
| 3,486,052 | 12/1969 | Jaeschke | 310/105 |
| 3,518,472 | 6/1970 | O'Callaghan | 310/95 |
| 3,549,921 | 12/1970 | Halstead | 310/105 |
| 3,566,168 | 2/1971 | Matsubara | 310/105 |
| 3,584,248 | 6/1971 | Inazawa-shi et al. | 310/68 R |
| 3,587,798 | 6/1971 | Schuman | 192/120 |
| 3,652,886 | 3/1972 | Riordan et al. | 310/168 |
| 3,716,788 | 2/1973 | Nishida et al. | 324/174 |
| 3,735,167 | 5/1973 | Wickersheimer | 310/168 |
| 3,742,270 | 6/1973 | Jaeschke | 310/105 |
| 3,769,533 | 10/1973 | Pauwels | 310/155 |
| 3,769,534 | 10/1973 | Wroblewski | 310/168 |
| 3,784,852 | 1/1974 | Noly | 310/105 |
| 3,924,585 | 12/1975 | Woods | 123/41.12 |
| 3,974,408 | 8/1976 | Fehr et al. | 310/103 |
| 3,996,485 | 12/1976 | Jaeschke | 310/103 |
| 4,033,202 | 7/1977 | Ahlen et al. | 477/131 |
| 4,040,508 | 8/1977 | Sunada et al. | 192/12 D |
| 4,043,621 | 8/1977 | Heinz | 384/510 |
| 4,090,592 | 5/1978 | Jovick et al. | 188/181 R |
| 4,110,647 | 8/1978 | Eslinger et al. | 310/168 |
| 4,159,433 | 6/1979 | Takayama et al. | 310/168 |
| 4,171,495 | 10/1979 | McNinch, Jr. | 310/155 |
| 4,209,213 | 6/1980 | Wussow | 439/28 |
| 4,209,214 | 6/1980 | Martinez | 439/22 |
| 4,227,861 | 10/1980 | LaFlame | 416/169 A |
| 4,355,709 | 10/1982 | Light | 192/58 B |
| 4,358,695 | 11/1982 | MacDonald et al. | 310/105 |
| 4,379,242 | 4/1983 | MacDonald | 310/105 |

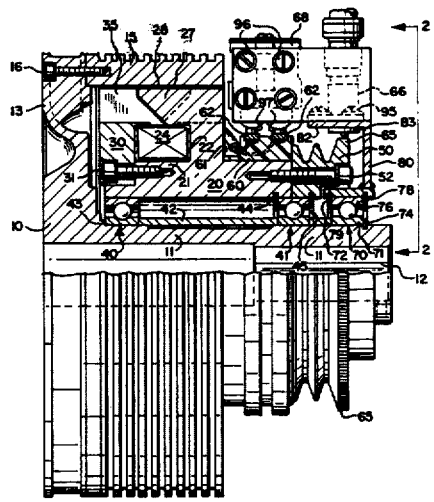

OTHER PUBLICATIONS

MCRT Non-Contact Strain Gage Torque Meters, S. Himmelstein and Company, 1975.
EM Ampli-Speed Magnetic Drive Horizontal and Vertical, McGraw-Edison, Electric Machinery Brochure 5100-PRD-312A, Sep. 1981.
EM Ampli-Speed Magnetic Drive Horizontal, Dresser-Rand, Electric Machinery brochure 5200-PRD-315A, Sep. 1981.
EM Ampli-Speed Magnetic Drive Vertical, Dresser-Rand, Electric Machinery brochure 5200-PRD-313A, Sep. 1981.
Fabricast, Inc. Standard Catalog Slip Ring Assemblies, 1967.
Two nameplates (photocopies) From Stromag Magna-Speed eddy current clutch, Model IKV-22-CSG and two photographs of actual clutch.
Declaration of James W. Albrecht, From File wrapper of U.S. Pat. No. 4,400,638.
Declaration of Harold G. Spriggs, From File wrapper of U.S. Pat. No. 4,400,638.
Graphite Metallizing Corporation, brochure, 1967.
Michigan Scientific Corporation, Series S Slip Rings Assemblies brochure, 1975.
Maurey Instrument Corporation, Instrumentation Slip Rings Type SR2066, brochure, 1979.
Industrial Electric Reels, Inc., Series SU 360° Swivel Unit brochure with prices 1956.
Systems Designer's Handbook, Jul. 1967.
Airflyte Electronics Company, brochure 1977.
Michigan Scientific Corporation, technical letter, Mar. 1967.
Channel Stepper Motor Reader Assembly, brochure, 1972.
EM Synchronizer, product brochure, 1961.
Easton Ajusto-Spede® Eddy-Current Drives Data Catalog, 1979.
Eaton Dynamatic AC Line Ajusto-Spede® Drive Instruct. Manual, 1980.
"Machinery's Handbook", Erik Oberg, Franklin D. Jones, and Holbrook L. Horton, 23rd Edition, pp. 2222-2223.
Bulletin 7300 "MCRT 3900X Non-Contact 2-Wire, 4-20 mA Torque Transmitters" S. Himmelstein and Company, 1992.
*ABC of Adjustable Speed with Ampli-Speed Magnetic Drive*, E-M Synchronizer, Special Issue 200-SYN-64, Electric Machinery Mfg., 1964.

*Primary Examiner*—Steven L. Stephan

[57] ABSTRACT

A shaft mounted eddy current variable speed drive or clutch has a hub which is adapted to be mounted on the shaft of a prime mover, such as an electric motor, and drives an armature. The hub includes an annular armature. A driven magnetic body is mounted for rotation on the hub and includes an array of poles magnetically associated with the armature through a working air grap and are energized from an electric coil mounted on the magnetic body. A slip ring assembly is also mounted on the magnetic body as well as an output pulley through which power is taken from the body. A non-rotating brush holder assembly, as well as a magnetic speed pick-up are mounted on a support bracket which bracket is, in turn, piloted to and mounted on the hub through a bearing. A torque arm prevents the rotation of the brush assembly and magnetic pick-up. The piloting of the non-rotating electrical components directly to the hub maintains a fixed and desired radial spacing of these components with their associated rotating components on the magnetic body.

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–7 is confirmed.

* * * * *